Figure 1:
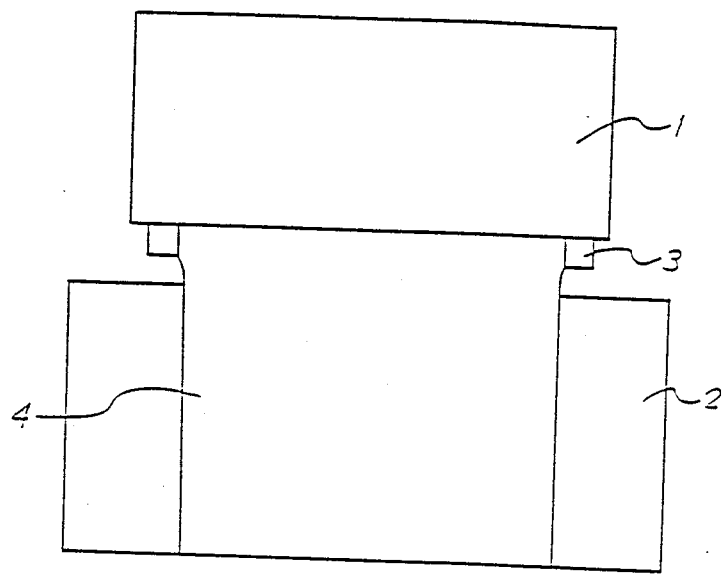

United States Patent [19]

Hosoi

[11] Patent Number: 4,986,746
[45] Date of Patent: Jan. 22, 1991

[54] APPARATUS FOR PREPARING POLYMER FILM

[75] Inventor: Mitsugu Hosoi, Shiga, Japan

[73] Assignee: Diafoil Company, Limited, Tokyo, Japan

[21] Appl. No.: 390,759

[22] Filed: Aug. 8, 1989

[30] Foreign Application Priority Data

Aug. 11, 1988 [JP] Japan .................................. 63-200667

[51] Int. Cl.$^5$ .............................................. B29C 47/14
[52] U.S. Cl. .................................... 425/224; 264/169; 264/216; 425/378.1; 425/380; 425/461
[58] Field of Search ....................... 264/216, 169, 212; 425/224, 378.1, 461, 466, 382.4, 174.8 E, 379.1, 325, 380

[56] References Cited

U.S. PATENT DOCUMENTS

| 2,364,435 | 12/1944 | Foster et al. | 264/216 |
| 3,223,757 | 12/1965 | Owens et al. | 264/22 |
| 3,456,293 | 7/1969 | De Smedt et al. | 425/66 |
| 3,870,454 | 3/1975 | Penrod | 425/378.1 |
| 3,984,508 | 10/1976 | Solop | 425/378.1 |
| 4,255,365 | 3/1981 | Heyer | 425/174.8 E |
| 4,693,677 | 9/1987 | Shigemoto et al. | 425/461 |

FOREIGN PATENT DOCUMENTS

| 2290290 | 7/1976 | France | 264/216 |
| 61-237619 | 10/1986 | Japan | 264/169 |
| 62-170319 | 7/1987 | Japan | 425/461 |
| 2114050A | 8/1983 | United Kingdom | 425/461 |

*Primary Examiner*—Jeffery Thurlow
*Attorney, Agent, or Firm*—Oblon, Spivak, McClelland, Maier & Neustadt

[57] ABSTRACT

A process for preparing polymer film includes the step of extruding a molten thermoplastic polymer through a die provided with neck-down prevention pieces onto a rotating cooling drum, and cooling the polymer to solidify, wherein the neck-down prevention pieces are made of aluminum or alumina and provided with a cooling device.

3 Claims, 1 Drawing Sheet

APPARATUS FOR PREPARING POLYMER FILM

FIELD OF THE INVENTION

This invention relates to a process and apparatus for the preparation of polymer films. More specifically, this invention relates to a process and apparatus for preparing a polymer film by a T die provided with neck-down prevention pieces to which adhesion of thermal decomposition products is small.

Conventionally, polymer sheets or films are prepared by extruding a molten thermoplastic polymer through a T die onto a rotating cooling drum to solidify the polymer thereon. When a polymer sheet or film is produced at a high speed by this method, a phenomenon called "neck-down" occurs. The "neck-down" is a phenomenon in which the molten polymer extruded from the die narrows and simultaneously becomes thick at both edges.

In order to prevent occurrence of this phenomenon, so-called neck-down prevention pieces are provided at both ends of the extrusion die opening. However, thermal decomposition products of the molten polymer gradually deposit and accumulate on the surface of the neck-down prevention pieces and continuous film formation is impaired.

That is, often the operation must be suspended for removing the deposit and cleaning the neck-down prevention pieces.

I have investigated the above phenomenon, and found that continuous film forming can be efficiently conducted by using a specific neck-down prevention pieces, which has led to this invention.

SUMMARY OF THE INVENTION

This invention provides, in the process of forming a sheet or film of polymer comprising extruding molten thermoplastic polymer through a T die provided with neck-down prevention pieces onto a rotating cooling drum to solidify it, an improved process characterized in that the neck-down prevention pieces are made of aluminum or alumina and are provided with a cooling device through which cooling gas is circulated.

Thermoplastic polymers applicable to the process of the invention are not specifically limited, although polyesters, polyolefins, polyimides, etc. are suitable and polyesters such as poly(ethylene terephthalate) and the like are preferable.

The invention will now be described in detail with reference to the attached drawings.

BRIEF DESCRIPTION OF THE ATTACHED DRAWINGS

FIG. 1 is a schematic representation of an apparatus for practicing the process of this invention, wherein member 1 is a die, member 2 is a rotating cooling drum, member 3 is a neck-down prevention piece and 4 represents a formed film.

Figure 2:
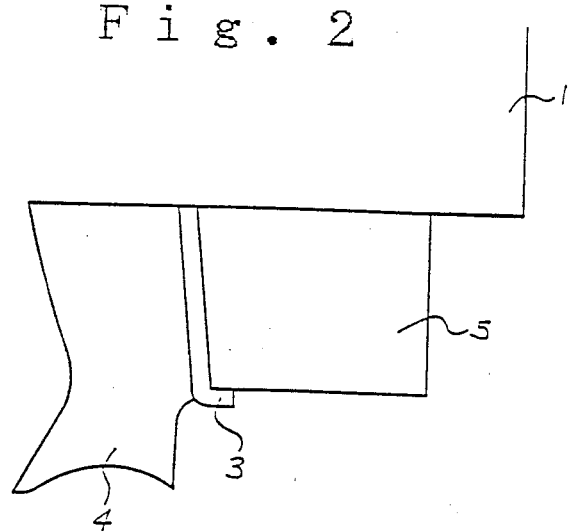

FIG. 2 is an enlarged representation of the part around a neck-down prevention piece, wherein member 3 is a neck-down prevention piece, member 5 is a cooling service and 4 represents a polymer film.

SPECIFIC DESCRIPTION OF THE INVENTION

As shown in the drawings, a molten thermoplastic polymer material 4 is extruded through a die 1, and cooled and solidified on a rotating cooling drum 2, in which the electrostatic cooling method as disclosed in U.S. Pat. No. 3,223,757 is preferably employed.

The neck-down prevention piece 3 is made of aluminum metal or alumina and is provided with a cooling device 5 integrally formed and made of the same material An aluminum piece the surface of which has turned to alumina by oxidation especially is preferable. Of course, a solid alumina piece can be used. The neck-down prevention piece 3 is mounted on the die preferably slightly inclined outward from the vertical direction. Further, the neck-down prevention piece is preferably cooled by a cooling device 5, which is provided with a through-bore through which cooling gas is circulated. The neck-down prevention pieces are usually cooled to a temperature lower than the temperature of the discharged polymer by 5–20° C., preferably 7–15° C. by said cooling means.

Cooling such that the temperature difference between the discharged polymer temperature and the neck-down piece temperature is less than 5° C. is insufficient because deposition of thermal decomposition product is not prevented. Cooling such that the temperature difference is over 20° C. is undesirable because polymer tends to solidify, impairing polymer flow. So the neck-down prevention pieces should be able to be cooled to the above-mentioned temperature range. The cooling device is, for instance, a block integrally formed with or attached to a neck-down prevention piece, said device being cooled by circulation of nitrogen or another inert gas or air through the bore provided therein, which is not shown in the drawing.

Deposition of thermal decomposition products on the thus constructed neck-down prevention piece is very small. Therefore, a polymer film can be produced continuously over a prolonged time.

Further, the invention is illustrated by working and comparative examples. However, the invention is not limited to the specific embodiment but includes all embodiments encompassed by the claims.

EXAMPLE 1

Molten poly(ethylene terephthalate) of 290° C. was extruded through a die 1 into a sheet and cooled on a rotating cooling drum 2 maintained at 30° C. and thus a film was formed. The film-forming speed was 50 m/min. A neck-down prevention piece 3 of annealed aluminum metal was provided with a cooling device 5 as described above. Nitrogen gas was passed therethrough so as to cool the neck-down prevention piece to 280° C. The operation was continued for 15 days without interruption. No adhesion of thermal decomposition products on the neck-down prevention pieces was observed. Good quality film was continuously formed.

COMPARATIVE EXAMPLE 1

Polymer film was made using the same die as used in Example 1 provided with neck-down prevention pieces of austenitic stainless steel under the same condition as in Example 1. After 24 hours, the operation became impossible because of deposition and accumulation of thermal decomposition product on the neck-down prevention pieces 3.

COMPARATIVE EXAMPLE 2

Polymer film was made using the same die as used in Example 1 under the same conditions as in Example 1 except that the neck-down prevention pieces were not cooled. After 48 hours operation, the film-forming became impossible because of deposition and accumulation of thermal decomposition products on the neck-down prevention pieces.

As is apparent from the above, this invention enables efficient high speed continuous film-making and, therefore, it is industrially valuable.

Having described my invention, I claim:

1. An apparatus for the continuous preparation of polymer film comprising:

a T-die having neck-down prevention pieces, wherein a molten thermoplastic polymer is extruded through said T-die onto a rotating cooling drum, and wherein said neck-down prevention pieces are made of aluminum or alumina and are provided with a cooling device through which a cooling gas is circulated.

2. The apparatus of claim 1, wherein said neck-down prevention pieces are cooled to a temperature 5° to 20° C. lower than the temperature of the molten polymer.

3. The apparatus of claim 1, wherein said neck-down prevention pieces are cooled to a temperature 7° to 15° C. lower than the temperature of the molten polymer.

* * * * *